United States Patent

[11] 3,607,858

[72] Inventors  Merle Vernon Querry
              Westwood, N.J.;
              Francis Fremonte Buck, Suffern, N.Y.
[21] Appl. No. 24,364
[22] Filed     Mar. 31, 1970
[45] Patented  Sept. 21, 1971
[73] Assignee  American Cyanamid Company
              Stamford, Conn.

[54] PROCESS FOR PREPARING LYOPHILIZED HUMAN BLOOD PROTEINS SUCH AS GAMMA GLOBULIN IN THE PRESENCE OF A NONIONIC SURFACTANT
4 Claims, No Drawings

[52] U.S. Cl.................................................. 260/112 B,
                                    34/5, 424/101, 424/177
[51] Int. Cl......................................................... C07g 7/00
[50] Field of Search........................................... 260/112 B;
                                    424/101, 177; 34/5

[56]           References Cited
          UNITED STATES PATENTS
Re.20,969  1/1939   Reichel .................... 34/5 X
2,085,391  6/1937   Reichel .................... 34/5 X
2,149,304  3/1939   Masucci .................... 34/5 UX
2,225,627  12/1940  Flosdorf .................... 34/5
2,677,700  5/1954   Jackson et al. .................... 424/101 X
3,024,167  3/1962   Damaskus .................... 260/112 X
3,449,316  6/1969   Querry .................... 260/112

OTHER REFERENCES
Process Biochem. 1968, 3(6), pp.11–22, Davies

*Primary Examiner*—Howard E. Schain
*Attorney*—Norton S. Johnson

ABSTRACT: Human blood proteins, such as alpha globulin, beta globulin, albumin, and particularly gamma globulin, are prepared in dry lyophilized form by freeze drying an aqueous solution in the presence of small amounts of nonionic surface active agents, the initial freezing being very rapid, from 1 to 3 minutes, preferably by freezing in small containers, such as vials, immersed in an alcohol Dry Ice bath.

3,607,858

PROCESS FOR PREPARING LYOPHILIZED HUMAN BLOOD PROTEINS SUCH AS GAMMA GLOBULIN IN THE PRESENCE OF A NONIONIC SURFACTANT

BACKGROUND OF THE INVENTION

Many human blood proteins, and particularly gamma globulin, have been lyophilized to form a dry powder which keeps will without refrigeration in enclosed containers and which can be reconstituted with a suitable aqueous diluent, which is usually sold in a second vial accompanying the lyophilized product. Lyophilization is carried out in the usual manner in a freezing chamber after slow freezing. When such lyophilized products are mixed with a suitable diluent, such as a pyrogen-free aqueous saline or glycine solution, it takes a relatively long time to disperse in the diluent, for example 45 minutes or more. This slow reconstitution is a practical drawback and is particularly noticeable with lyophilized gamma globulin from aqueous solutions derived from human placenta.

SUMMARY OF THE INVENTION

The present invention produces a lypohilized human blood protein, and particularly gamma globulin, which can be reconstituted in an aqueous diluent, producing complete solution in as little as 10 minutes or less. The essential novelty on which the present invention depends is very rapid freezing for lyophilization of a solution which contains small amounts, for example from 0.07 to 1.5 percent of a nonionic surface active agent. The lyophilized product is dry, storage stable in tight containers, and can be reconstituted in aqueous diluents very rapidly, for example, 10 minutes or less.

The process of the present invention may be applied to any human protein, but is particularly useful in producing lyophilized gamma globulin, which may be considered the preferred modification. The starting material can be prepared in various well known ways, one method being described in U.S. Pat. No. 3,449,316, June 10, 1969, In general the material is obtained from a concentrated aqueous solution, for example 8 to 16 percent, recovered from human placenta. The method of preparing the starting material for lyophilization is not significantly changed by the present invention, which is directed to the lyophilization step but does not require a particular special preparation of the aqueous solution of the blood protein which is the starting material.

In carrying out the process of the present invention an aqueous solution of a blood protein, such as an 8–16 percent solution of gamma globulin in pyrogen-free water or suitable salt solution, which may contain preservatives and is mixed with about an equal volume of sterile solution containing about one tenth of an equivalent volume of a nonionic surface active agent and one half of an equivalent volume of pyrogen-free water. Containers, of course, must be pyrogen free and sterile. The solution in the containers, preferably small vials, is then quick frozen in from 1 to 3 minutes by partial immersion of the container into a lower alcohol Dry Ice bath. The frozen material is then dried under vacuum in the customary manner and the vials then sealed with sterile plugs and covers.

It should be noted that it is essential that the process involve both quick freezing and the presence of the nonionic surface active agents. Neither alone will produce the improved products of the present invention, which can be rapidly reconstituted in suitable diluents, for example pyrogen-free saline or glycine solution. When saline solutions are used, ordinarily they should be of physiolgical concentration; and in the case of glycone solutions, 0.3 molar glycine is quite suitable. As in the case with slow frozen lyophilized products sold in the past, it is ordinarily desirable to sell a suitable container, such as a vial, with another vial containing the right amount of the diluent. This practice, as such, is not the novelty of the invention, but it is an advantage that the product can be sold in the usual form.

The particular nonionic surface active agent is not critical, typical types being the polyoxalene having an average molecular weight of 350 and a melting point of 50° F., which is generally known as a "polyol," (Merck Index 1968, p. 846), or a polysorbate or polyoxyethylene. The latter material is a complex mixture of polyoxyethlene ethers and mixed partial oleic esters of sorbitol anhydride. A typical form is described in Merck Index 1968, p. 848. The types of nonionic surface active agents referred to above are merely typical and others may be used. Of course a mixture of surface active agents of different types is also useful.

In the more specific descriptions to follow, a typical human blood protein, the preferred gamma globulin, will be described as illustrative of the process.

DESCRIPTION OF THE PREFERRED EMBODIMENTS

The invention will be described in connection with the following examples, which are illustrative, and the invention is not limited to the details therein set forth.

EXAMPLE 1

A human blood protein consisting essentially of gamma globulin and referred to usually as Cohn Fraction II was suspended in water and permitted to stand 2° C. for 16 hours. An insoluble precipitate was separated by decantation and the supernatant liquid was then lyophilized. The dry powder resulting was reconstituted to a 16 percent stock solution. This stock solution 29 then diluted to 8 percent concentration with pyrogen-free water. Varying amounts of 1 percent polyoxyethylene sorbate, 2 percent polyols, described respectively in the Merck Index 1968, pp. 848 and 846, were then added to portions of the 8 percent gamma globulin solution and these portions were quick frozen in 1 to 3 minutes and lyophilized, and one of each pair of vials of each surfactant concentration was sealed under vacuum. The diluent for reconstruction was 5.0 ml. of 0.85 percent saline at a pH of 7.0. The results are summarized in table I. For convenience the polyethylene sorbate is listed in column A and the polyol, column B.

TABLE I

| Milliters of 1% A | Milliters of 1% B | Solution Time In Minutes Vacuum | No Vacuum |
|---|---|---|---|
| 1.0 |  | 7 | 8 |
|  | 1.0 | 10 | 13 |
| 0.8 |  | 10 | 11 |
|  | 0.8 | 12 | 35 |
| 0.6 |  | 10 | 16 |
|  | 0.6 | 32 | 77 |
| 0.4 |  | 23 | 28 |
|  | 0.4 | 45 | 90 |
| 0.2 |  | 30 | 32 |
|  | 0.2 | 210 | 210 |
| 0.1 |  | 42 | 49 |
|  | 0.1 | 210 | 210 |
| 0.05 |  | 100 | 100 |
|  | 0.05 | 210 | 210 |
| 0.0 (control) (control) | 0.0 (control) | 210 | 210 |

| Milliliters of 2% A | Milliliters of 2% B |  |  |
|---|---|---|---|
| 1.0* |  |  | 21 |
| 1.0 |  | 7 | 11 |
|  | 1.0* |  | 34 |
|  | 1.0 | 17 | 18 |
| 0.8 |  | 8 | 21 |
|  | 0.8 | 17 | 20 |
| 0.6 |  | 15 | 18 |
|  | 0.6 | 10 | 20 |
| 0.5* |  |  | 20 |
| 0.5 |  | 10 | 18 |
|  | 0.5* |  | 18 |
|  | 0.5* | 6* | 16 |

*50 milligrams of salt added prior to lyophilization. Reconstituted with 5.0 ml. of water.

In the table each portion of the 8 percent ISG, when 1 ml. of the 1 percent surfactant in column A was added, represented concentration of 0.14 percent; whereas in column B where the surfactant concentration was 2 percent, 1 ml. corresponds to 0.28 percent. It will be seen that vials sealed under vacuum reconstituted somewhat more rapidly, for reasons which are not completely known, and with the preferred amount of surfactant reconstitution time ran from about 7 to 10 minutes for the vacuum sealed vials. This should be compared with 210 minutes for the controls, which had no surfactant. The bottom part of the table also includes some products to which 50 mg. of salt were added before lyophilization, and reconstitution was with 5 ml. of diluent.

EXAMPLE 2

A 1-liter portion of the 16 percent ISG in 0.3 molar glycine solution was placed in sterile pyrogen-free vessel and a 600 ml. portion of a solution prepared by mixing 120 milliliters of a 1 percent solution of a surfactant of column B in table I and 480 ml. of pyrogen-free water was added to the vessel, to yield a final concentration of 0.07 percent surfactant. This mixture was filled into sterile vials of 10-ml. size and pyrogen-free, the amount added being about 2.5 ml. per vial, which corresponds to approximately 250 mg. of ISG. The vials were lyophilized as described in Example 1 and a diluent for reconstitution was prepared by mixing 8.5 grams of glycine and pyrogen-free water to a concentration of 0.113 molar. This reconstitution diluent was sterile filled into a series of vials, each vial containing 2.5 ml. of diluent.

To reconstitute, the glycine diluent was removed from a vial using a sterile syringe and placed in a vial containing the dry cake of ISG, to give a final glycine concentration of 0.3 molar. With occasional swirling, complete solution took place in about 7 minutes. When samples were frozen slowly, 30–45 minutes, reconstitution time averaged about 45 minutes. Samples dried without any surfactant, whether frozen quickly or slowly, required up to 2 hours for reconstitution.

EXAMPLE 3

A solution of immune serum globulin, equivalent to Cohn Fraction II, containing 3–4 percent protein, was prepared and then divided into three parts for preparation of the solutions listed below:

Solution I, control, 1.282 l. of the ISG solution above. Solution II, 1.282 l. of the ISG solution above and 30.0 ml. of 1 percent the surfactant of column A of table I. Solution III, 1.282 l. of the ISG solution above and 30.0 ml. of 1 percent the surfactant of column B of table I.

The above solutions were lyophilized. Each lyophilized ISG powder was reconstituted with 0.85 percent saline solution. The antibody titers are not affected by the surfactants.

The results are shown in table II.

TABLE II

| Solution | Diphtheria titer | Polio titer | Measles titer | Appearance |
|---|---|---|---|---|
| I | 3+, 5- | 1:2896 | 1:664 | Slightly turbid. |
| II | 3+, 5- | 1:2580 | 1:724 | Clear. |
| III | 3+, 5- | 1:2580 | 1:664 | Do. |

We claim:
1. A process for the preparation of a lyophilized blood protein from human blood which comprises adding from 0.07 to 1.5 percent of a nonionic surfactant to the unlyophilized protein solution and freezing rapidly prior to drying under vacuum.
2. A process according to claim 1 in which the protein is immune serum globulin.
3. A process according to claim 2 in which the rapid freezing is effected by immersing a small container containing the solution of the immune serum globulin in a bath of ethanol and Dry Ice.
4. A process according to claim 1 in which the rapid freezing is effected by immersing a small container containing the solution of the immune serum globulin in a bath of ethanol and Dry Ice.